United States Patent
Okamoto

[19]

[11] Patent Number: 6,163,418
[45] Date of Patent: Dec. 19, 2000

[54] ADJUSTMENT STRUCTURE FOR FAST LOCATING ZOOM LENS

[75] Inventor: Hajime Okamoto, Kanagawa-ken, Japan

[73] Assignee: Toptronic Industrial Co., Ltd, Taipei, Taiwan

[21] Appl. No.: 09/395,357

[22] Filed: Sep. 14, 1999

[30] Foreign Application Priority Data

Aug. 13, 1999 [TW] Taiwan .................................. 88114009

[51] Int. Cl.[7] .............................. G02B 7/02; G02B 15/14
[52] U.S. Cl. .......................... 359/822; 359/694; 359/818; 359/826
[58] Field of Search ..................................... 359/822, 821, 359/823, 825, 819, 818, 826, 830, 694, 704, 705, 706

[56] References Cited

U.S. PATENT DOCUMENTS

| | | | |
|---|---|---|---|
| 3,817,601 | 6/1974 | Colaiace et al. | 359/700 |
| 6,046,864 | 4/2000 | Onda | 359/819 |
| 6,094,535 | 7/2000 | Onda | 396/84 |

*Primary Examiner*—Georgia Epps
*Assistant Examiner*—Saeed Seyrafi
*Attorney, Agent, or Firm*—Browdy And Neimark

[57] ABSTRACT

A zoom lens comprises a fixed cylinder, an outer movable cylinder, and an inner movable cylinder which is provided in the interior thereof with a shutter and a front group lens. The front group lens is fixed by an outer frame which is fastened with the shutter. The outer frame retains a chain plate capable of being driven by a rotary plate of the shutter. The chain plate has an indicator portion. The inner movable cylinder is provided in the inner wall thereof with a reference indicium, which is level with and aligned with the indicator portion of the chain plate at such time when the zoom lens is located at various focusing positions.

2 Claims, 3 Drawing Sheets

ADJUSTMENT STRUCTURE FOR FAST LOCATING ZOOM LENS

FIELD OF THE INVENTION

The present invention relates generally to a video camera, and more particularly to an adjustment structure for locating rapidly the zoom lens of the video camera.

BACKGROUND OF THE INVENTION

The camera assembly is not completed until the measurement of the focal positions, such as the wide-angle position and the telephoto position, of the zoom lens, and the locating of the zoom lens are done. Generally speaking, the zoom lens is formed of a fixed cylinder, an outer movable cylinder, and an inner movable cylinder. The inner movable cylinder is provided therein with a shutter and a front group lens. In order to make sure that the zoom lens is precisely located to bring about a good focal effect, it is necessary to make use of an instrument to calibrate the zoom lens.

Such a measurement of optical position and a locating adjustment as described above involve a number of items, one of which is to do the locating adjustment of the lens disposed in the interior of the inner movable cylinder.

The lens of the inner movable cylinder is fixed by an outer frame which is fitted into a chain plate which is in turn pivoted to a rotary plate of the shutter. The outer frame is fastened in the interior of the inner movable cylinder by nuts and bolts. As the outer frame is turned, the lens is actuated to displace. When the zoom lens is set up in the camera body, the focusing lens is set at the position of infinite distance. Thereafter, the outer frame is driven by a tool to turn in conjunction with an instrument which is used to assist the measurement, so as to locate the lenses with precision.

Such a conventional way as described above for locating the lens is rather time-consuming in view of the fact that the measurement must be done repeatedly so as to set the focusing lens at the position of infinite distance.

SUMMARY OF THE INVENTION

The primary objective of the present invention is to provide an adjustment structure which is intended to locate rapidly the lens of the inner movable cylinder of a zoom lens.

In keeping with the principle of the present invention, the foregoing objective of the present invention is attained by an adjustment structure for locating the lens of an inner movable cylinder of a zoom lens. The zoom lens is formed of a fixed cylinder, an outer movable cylinder, in addition to the inner movable cylinder. The inner movable cylinder is provided therein with a shutter, and a front group lens which is fixed in an outer frame fastened with the shutter and a chain plate. The chain plate is driven by a rotary plate of the shutter and is provided with an indicator. The inner movable cylinder is provided with a reference indicium. The focusing lens is set in the proximity of the position of infinite distance at the time when the zoom lens is located at various focusing positions. In the meantime, the indicator portion of the chain plate is level with and in alignment with the reference indicium of the inner movable cylinder. As a result, the zoom lens is capable of being located with precision after the assembly of the zoom lens.

DETAILED DESCRIPTION OF THE INVENTION

Figure 1:
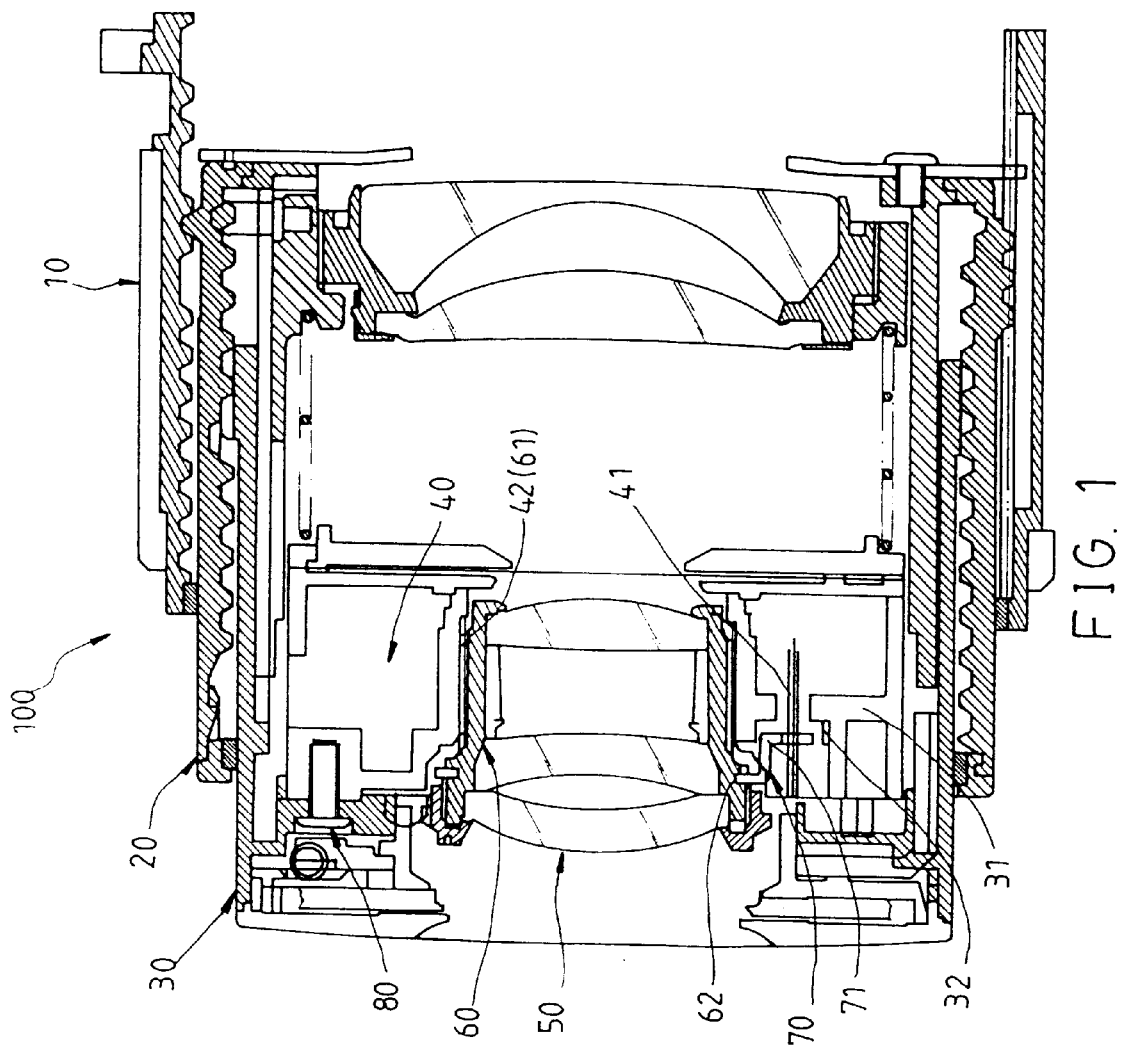
FIG. 1 shows a sectional view of a zoom lens of a preferred embodiment of the present invention.
Figure 2:
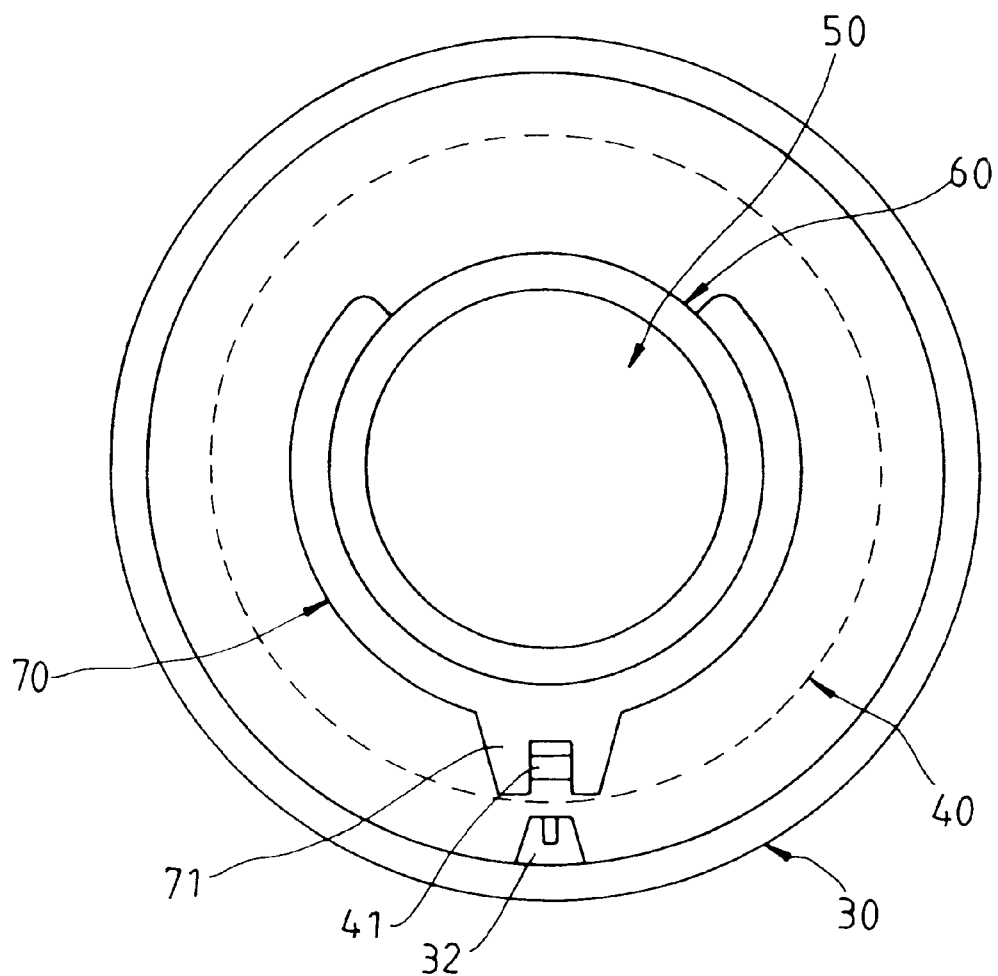
FIG. 2 shows a plan view of the zoom lens of the preferred embodiment of the present invention set at the position of infinite distance.

As shown in FIGS. 1 and 2, a fast locating structure of the present invention is formed of a fixed cylinder 10, an outer movable cylinder 20, an inner movably cylinder 30, and a zoom lens 100. The inner movable cylinder 30 is provided in the interior thereof with a shutter 40 and a front group lens 50 which is fixed in an outer frame 60 mounted on the shutter 40. The outer frame 60 is retained by a chain plate 70 which is driven by a rotary plate 41 of the shutter 40.

The present invention is characterized by the outer frame 60 which is provided in the outer peripheral surface thereof with an outer threaded section 61. The shutter 40 is provided with an inner threaded hole 42 which is engaged with the outer threaded section 61 to enable the front group lens 50 to locate at the axial center of the inner movable cylinder 30. As the outer frame 60 is turned, the front group lens 50 displaces along the direction of the axis of the inner movable cylinder 30. The outer frame 60 is provided in the outer peripheral surface of the front section thereof with an insertion slot 62.

Figure 3:
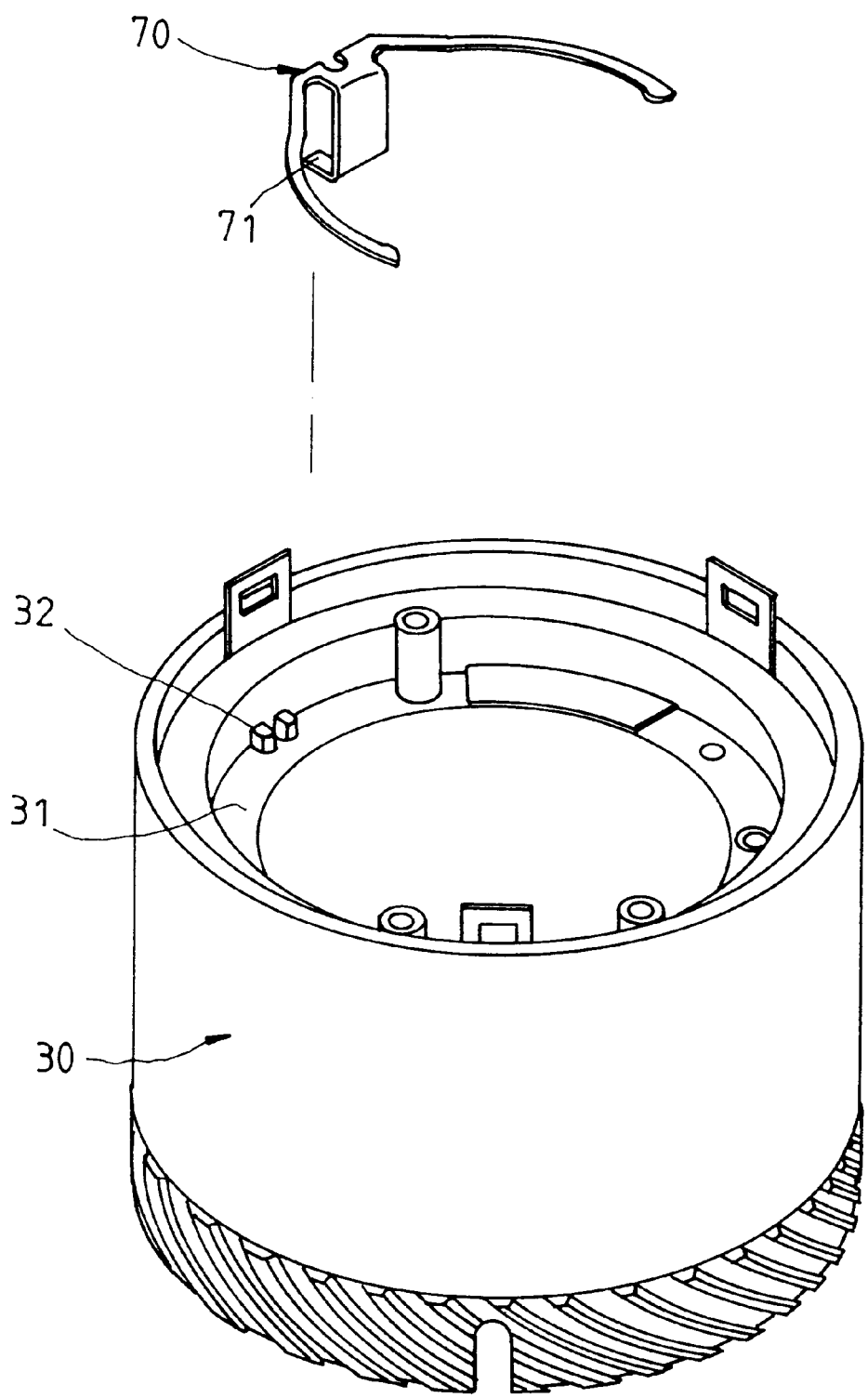
FIG. 3 shows a schematic view of the chain plate and the inner movable cylinder of the preferred embodiment of the present invention.

As shown in FIG. 3, the chain plate 70 is of a C-shaped construction and is engaged with the insertion slot 62 of the outer frame 60. The chain plate 70 is provided at the center thereof with an indicator portion 71 formed of two clamp pieces holding the rotary plate 41 of the shutter 40.

The inner movable cylinder 30 is provided in the inner wall of the outer end thereof with a stop edge 31 which is in turn provided thereon with a reference indicium 32 of a protruded construction.

The chain plate 70 is retained by the outer frame 60 of the front group lens 50 such that the chain plate 70 turns on the insertion slot 62, and that the outer threaded section 61 of the outer frame 60 is engaged with the inner threaded hole 42 of the shutter 40. As the outer frame 60 is turned, it displaces progressively. The shutter 40 is fixed in the interior of the inner movable cylinder 30 by a bolt 80.

After the zoom lens 100 is mounted on a camera body, the focusing lens is set at the telephoto position or the wide-angle position before adjusting the lenses. Thereafter, the indicator portion 71 of the chain plate 70 is held with a tool so as to fix the chain plate 70. When the outer frame 60 is rotated, the outer frame 60 is displaced along the direction of the axis of the inner movable cylinder 30. The chain plate 70 is actuated to displace along with the outer frame 60. The focusing lens is set in the proximity of the position of infinite distance when the chain plate 70 is level with the reference indicium 32 of the inner movable cylinder 30 such that the indicator portion 71 is aligned with the reference indicium 32. The chain plate 70 is finally fixed on the outer frame 60 by an adhesive. In light of the focusing position of the zoom lens 100 being set in the proximity of the position of infinite distance, the lens can be located with precision at various focusing positions. The present invention is relatively simple in construction and cost-effective.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. An adjustment structure for fast locating a zoom lens comprising a fixed cylinder, an outer movable cylinder, and an inner movable cylinder which is provided in the interior thereof with a shutter and a front group lens, said front group lens being fixed by an outer frame fastened with said shutter, said outer frame retaining a chain plate capable of being driven by a rotary plate of said shutter; wherein said chain plate has an indicator portion, said inner movable cylinder provided in an inner wall thereof with a reference indicium wherein said indicator portion of said chain plate is level with and in alignment with said reference indicium of said inner movable cylinder at such time when said zoom lens is located at various focusing positions.

2. The adjustment structure as defined in claim 1, wherein said indicator portion of said chain plate is formed of two clamp pieces; and wherein said rotary plate of said shutter is held by said two clamp pieces.

* * * * *